US012400508B2

(12) United States Patent
Niegmann et al.

(10) Patent No.: US 12,400,508 B2
(45) Date of Patent: Aug. 26, 2025

(54) ACCESS CONTROL DEVICE

(71) Applicant: ASSA ABLOY AB, Stockholm (SE)

(72) Inventors: Kaj Niegmann, Hägersten (SE); Robin Dahlbäck, Stockholm (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 18/687,417

(22) PCT Filed: Sep. 21, 2022

(86) PCT No.: PCT/EP2022/076171
§ 371 (c)(1),
(2) Date: Feb. 28, 2024

(87) PCT Pub. No.: WO2023/046723
PCT Pub. Date: Mar. 30, 2023

(65) Prior Publication Data

US 2024/0355163 A1 Oct. 24, 2024

(30) Foreign Application Priority Data

Sep. 24, 2021 (SE) .................................... 2151168-8

(51) Int. Cl.
*G07C 9/00* (2020.01)
*G07C 9/29* (2020.01)

(52) U.S. Cl.
CPC ...................................... *G07C 9/29* (2020.01)

(58) Field of Classification Search
CPC .................................................. G07C 9/00174
USPC ......................................................... 235/382
See application file for complete search history.

(56) References Cited

U.S. PATENT DOCUMENTS 5,826,450 A 10/1998 Lerchner et al.
10,671,904 B2 * 6/2020 Mullis .............. G06K 19/07345
2012/0075064 A1 3/2012 Buckingham et al.
2013/0207778 A1 8/2013 Neafsey et al.
(Continued)

FOREIGN PATENT DOCUMENTS

CN 107665533 2/2018
EP 2348490 7/2011
(Continued)

OTHER PUBLICATIONS

"PCT EP 2022076171 IPRP mailed Nov. 12, 2023", 18 pages.
(Continued)

*Primary Examiner* — Toan C Ly
(74) *Attorney, Agent, or Firm* — Schwegman Lundberg & Woessner, P.A.

(57) ABSTRACT

It is provided an electronic lock for controlling access to a restricted physical space. The electronic lock comprises: a first credential interface for accepting a credential from a user for evaluating whether access for the user should be granted; and a second credential interface for accepting a credential from a user for evaluating whether access for the user should be granted. The first credential interface is configured to be activated when the user causes an interaction with the first credential interface, without activating any other credential interfaces. The second credential interface is configured to be activated when a user causes an interaction with the second credential interface, without activating any other credential interfaces.

12 Claims, 1 Drawing Sheet

(56) References Cited

U.S. PATENT DOCUMENTS

| | | | | |
|---|---|---|---|---|
| 2015/0353033 | A1 | 12/2015 | Pribisic et al. | |
| 2017/0002586 | A1 | 1/2017 | Lee | |
| 2017/0011573 | A1* | 1/2017 | Belhadia | H04W 4/80 |
| 2017/0243425 | A1 | 8/2017 | Meganck et al. | |
| 2019/0213818 | A1 | 7/2019 | Einberg | |
| 2020/0219345 | A1 | 7/2020 | Beck et al. | |
| 2020/0327757 | A1 | 10/2020 | Kelley et al. | |

FOREIGN PATENT DOCUMENTS

| | | |
|---|---|---|
| WO | 2016023020 | 2/2016 |
| WO | 2021077738 | 4/2021 |
| WO | 2023046723 | 3/2023 |

OTHER PUBLICATIONS

"PCT EP 2022076171 ISR mailed Jan. 16, 2023", 6 pages.
"PCT EP 2022076171 Written Opinion mailed Jan. 16, 2023", 8 pages.
"PCT EP 2022076171 Written Opinion mailed Jul. 25, 2023", 7 pages.
"SE application 2151168-8 OA mailed May 5, 2022", 9 pages.

* cited by examiner

ACCESS CONTROL DEVICE

CROSS-REFERENCE TO RELATED APPLICATION(S)

This application is a national stage application under 35 U.S.C. § 371 of PCT Appl. No. PCT/EP2022/076171, titled "Access Control Device," filed Sep. 21, 2022, which claims priority to Swedish Patent Appl. No. 2151168-8, filed Sep. 24, 2021, each of which is incorporated herein by reference in its entirety.

TECHNICAL FIELD

The present disclosure relates to the field of access control and in particular to an access control device with multiple credential input interfaces.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using an electronic key stored on a special carrier (fob, card, etc.) or in a smartphone, that interacts with an access control device that controls the electronic lock. Such electronic access control provides a number of benefits, including improved flexibility in management of access rights, audit trails, key management, etc.

Many access control devices of today are configured to accept a wide variety of credentials, e.g. passcodes entered using a keypad, RFID (Radio-Frequency Identification) tags, smartphones with BLE (Bluetooth Low Energy) communication, etc. A corresponding number of credential interfaces must then be provided in the access control device. However, especially when the access control device is battery-powered, the power consumption required to support several credential interfaces can be infeasible.

SUMMARY

One object is to provide an access control device with multiple credential interfaces that is more power effective than the prior art.

According to a first aspect, it is provided an electronic lock for controlling access to a restricted physical space. The electronic lock comprises: a first credential interface for accepting a credential from a user for evaluating whether access for the user should be granted; and a second credential interface for accepting a credential from a user for evaluating whether access for the user should be granted. The first credential interface is configured to be activated when the user causes an interaction with the first credential interface, without activating any other credential interfaces. The second credential interface is configured to be activated when a user causes an interaction with the second credential interface, without activating any other credential interfaces.

The electronic lock may further comprise a third credential interface for accepting a credential from a user for evaluating whether access for the user should be granted, the third credential interface being configured to be activated when a user causes an interaction with the third credential interface, without activating any other credential interfaces.

The first credential interface may be a reader for reading a near-field radio key tag, wherein the first credential interface is configured to be activated when an interaction occurs that the key tag is presented to the reader.

The first credential interface may be a Radio Frequency Identification, RFID, reader or a Near-Field Communication, NFC, reader.

The first credential interface may be configured to be activated by a magnet of the key tag.

The second credential interface may be a keypad, wherein the second credential interface is configured to be activated when an interaction occurs that a key on the keypad is pressed.

The third credential interface may be a short-range wireless communication module, wherein the third credential interface is configured to be activated when the user physically interacts with the electronic lock.

The third credential interface may support at least one of Bluetooth Low Energy, BLE, Bluetooth, or Zigbee.

The third credential interface may be configured to be activated when the user turns a doorknob or doorhandle associated with the electronic lock.

The electronic lock may further comprise an energy harvesting device configured to convert mechanical energy from regular lock or door manipulations by the user to electrical energy to power the electronic lock.

Each credential interface may be configured to accept a credential from a user in the form of an electronic key, a passcode, and/or biometry.

Each activation may imply a transition from a low-power state to an active state.

The low-power state may be a standby state.

The low-power state may be an unpowered state.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein provide more efficient power consumption for an access control device (such as an electronic lock). Specifically, credential interfaces remain in low-power state (e.g. powered off or standby state) as much as possible, even when other credential interfaces are activated. For instance, if, from a state of all credential interfaces being in a low-power state, a key on a keypad of the access control device is pressed, only the credential interface of the keypad is activated. Other credential interfaces, such as RFID (Radio Frequency Identification) or BLE (Bluetooth Low Energy) can remain in a low-power state. Hence, no power is wasted to activate credential interfaces that are not used.

Figure 1:
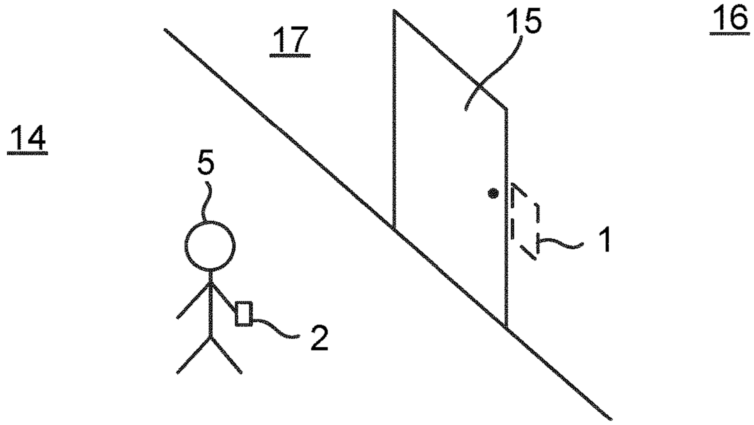
FIG. 1 is a schematic diagram showing an environment in which embodiments presented herein can be applied.

FIG. 1 is a schematic diagram showing an environment in which embodiments presented herein can be applied. Access to a physical space 16 is restricted by a door 15, or other openable barrier (e.g. gate, window, etc.), which is selectively unlockable. The door 15 stands between the restricted physical space 16 and an accessible physical space 14. The door 15 is provided in a surrounding physical structure 17, such as a wall, fence, etc., which also restricts passage between the accessible physical space 14 and the restricted physical space 16. Note that the accessible physical space 14 can be a restricted physical space in itself, but in relation to this door 15, the accessible physical space 14 is accessible. In order to control access to the physical space 16, by selectively unlocking the door 15, an access control device 1 is provided. The access control device 1 is also referred to an electronic lock 1.

The access control device/electronic lock 1 can be provided in the structure 17 surrounding the door 15 (as shown), the electronically controllable lock 4 can be provided in the door 15 itself (not shown), or partly in the surrounding structure 17 and partly in the door 15 (not shown). The access control device/electronic lock 1 can be in a locked state or in an unlocked state. The access control device/electronic lock 1 can contain electronically controllable mechanical lock components for implementing the physical locking and unlocking, or the access control device/electronic lock 1 can be connected to such lock components. When the access control device/electronic lock 1 is in an unlocked state, the door 15 can be opened and when the access control device/electronic lock 1 is in a locked state, the door 15 cannot be opened. In this way, access to a restricted physical space 16 is controlled by the access control device/electronic lock 1.

A user 5 wants to enter through the door 15 to access the restricted physical space 16. Proper credentials must be provided to the access control device/electronic lock 1 for access to be granted.

One type of credential is an electronic key 2. The electronic key 2 can be in any suitable format that allows access control device/electronic lock 1 to communicate (wirelessly or conductively) with the electronic key 2 to evaluate whether to grant access. For instance, the electronic key 2 can be in the form of a key fob, a key tag, a key card, a hybrid mechanical/electronic key or the electronic key can 2 be embedded in a smartphone. The communication between the electronic key 2 and the access control device/electronic lock 1 can occur using any suitable wireless interface, e.g. using Bluetooth or BLE (Bluetooth Low Energy), ZigBee, RFID, NFC (Near-Field Communication), any of the IEEE 802.11x standards (also known as Wi-Fi), etc. Alternatively, the communication between the electronic key 2 and the access control device/electronic lock 1 can occur based on a galvanic connection, e.g. by inserting the electronic key 2 in a socket of the access control device/electronic lock 1.

It is to be noted that, while only one electronic key 2 and user 5 are shown in FIG. 1, there can be any suitable number of users with respective electronic keys.

As an alternative to using a physical credential such as the electronic key 2, the credential can be in the form of a PIN (Personal Identification Number) or other passcode that the user inputs to the access control device/electronic lock 1, e.g. on a keypad, touchpad, or other user input device.

The access control device/electronic lock 1 accepts several (at least two) types of credentials.

Figure 2:
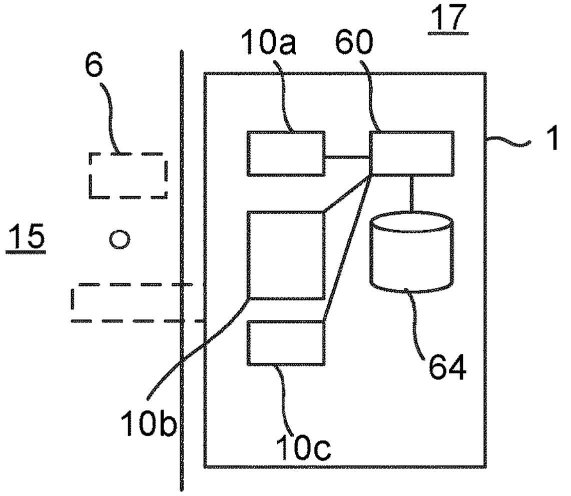
FIG. 2 is a schematic detailed diagram of the access control device/electronic lock of FIG. 1.

FIG. 2 is a schematic detailed diagram of the access control device/electronic lock 1 of FIG. 1. The access control device/electronic lock 1 is here shown with various credential interfaces 10*a-c*. It is to be noted that while the access control device/electronic lock 1 of FIG. 2 is shown with three credential interface 10*a-c*, the access control device/electronic lock can have a combination of any suitable number of credential interfaces, as long as there are at least two credential interfaces. For instance, there can be one or more biometric credential interfaces, such as a fingerprint reader, face scanner, iris scanner, etc. Each credential interface is provide for accepting a credential from a user for evaluating whether access for the user 5 should be granted to the restricted physical space.

A first credential interface 10*a* is provided as a reader for reading a near-field radio key tag. For instance, the first credential interface 10*a* can be implemented as an RFID reader or a Near-Field Communication (NFC) reader. The reader (thus being the first credential interface 10*a*) is activated when an interaction occurs that a key tag (of the user 5) is presented to the reader. Optionally, the reader is activated by a permanent magnet provided on the key tag. The magnet can then cause a Reed switch to close, which connects the reader to power. In this way, no polling, or any other power consuming activity, is needed when the reader is in a low-power (off or standby) state.

A second credential interface 10*b* is provided as a keypad. The keypad can e.g. be a numerical keypad made up of separate keys for digits 0-9 as well as keys for and '#'. Other configurations of keys are also possible. The keypad (being the second credential interface 10*b*) is activated when an interaction occurs that a key on the keypad is pressed (by the user 5). The keypad can be configured such that when any key is pressed, this causes the keypad to be activated for all keys, optionally also lighting up the keypad for an indication of activation and/or aesthetics. In this way, no polling, or any other power consuming activity, is needed when the keypad is in a low-power (off or standby) state.

A third credential interface 10*c* is provided as a short-range wireless communication module. For instance, the third credential interface can be implemented as a BLE module, Bluetooth module or Zigbee module. In order to save power when in low-power state, the communication module can be activated when the user physically interacts with the access control device/electronic lock 1. For instance, a pushbutton (e.g. provided on the doorknob or handle) connected to the access control device/electronic lock can connect the communication module to power. Alternatively, when the user turns the doorknob or door-handle associated with the access control device/electronic lock, this can close a circuit that powers the communication module or provides a signal to the communication module, setting the communication module in the active state. When set into the active state by the physical action of the user, no polling, or any other power consuming activity, is needed when the communication module is in a low-power (off or standby) state.

According to embodiments presented herein, when the user 5 approaches the access control device/electronic lock 1 and uses a credentials with one of the credential interfaces 10*a-c* (of the access control device/electronic lock 1) to request access so the restricted space 16, only the credential interface 10*a-c* of the presented credential is activated. The other credential interfaces remain in the low power state. In other words, when the user causes an interaction with one credential interface of the access control device/electronic lock, this credential interface is activated without activating any other credential interfaces.

In this way, a significant amount of power is saved, compared to multiple credential interfaces constantly polling for the presence of a credential.

Optionally, the access control device/electronic lock 1, further comprises an energy harvesting device 6 configured to convert mechanical energy from regular lock or door manipulations by the user to electrical energy to power the access control device/electronic lock 1. For instance, the action of turning the doorhandle or doorknob of the access control device/electronic lock can be converted to electrical energy using appropriate mechanical components and a generator. Alternatively or additionally, the action of inserting a key device into a socket of the portable key device can be converted to electrical energy using appropriate mechanical components and a generator. Alternatively or additionally, the action of opening and/or closing the door can be converted to electrical energy using appropriate mechanical components and a generator.

The access control device/electronic lock also comprises a processor 60 as well as memory 64 for processing and storing data.

Figure 3:
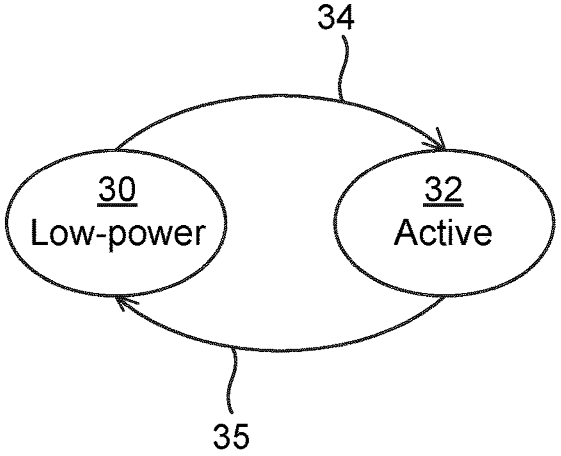
FIG. 3 is a state diagram illustrating the states and transitions of each one the credential interfaces of FIG. 2.

FIG. 3 is a state diagram illustrating the states and transitions of each one the credential interfaces 10*a-c* of FIG. 2.

There is a low-power state 30 and an active state 32. The credential interface 10*a-c* is in the low-power state 30 most of the time and is only in the more power demanding active state 32 when needed. The low-power state 30 can imply an unpowered state, in which no power at all is supplied to the credential interface, i.e. that the credential interface 10*a-c* is powered off, or the low-power state 30 can be a standby state in which only minimal amounts of power is consumed (compared to the active state 32) from which the active state can be entered with an appropriate input signal.

A wake-up event 34 causes the credential interface 10*a-c* to transition from the low-power state 30 to the active state 32. When in the active state, the access control device/electronic lock 1 performs access control based on the activated credential interface 10*a-c*. A sleep event 35 causes the credential interface 10*a-c* to transition from the active state 32 to the low-power state 30.

For the first credential device 10*a*, the reader, the wake-up event 34 can e.g. be that the tag is presented to the reader. Optionally, the wake-up event 34 is implemented by a permanent magnet provided on the key tag closing a magnetically controlled switch to connect the reader to power.

For the second credential interface 10*b*, the keypad, the wake-up event 34 can e.g. be that a key on the keypad is pressed (by the user 5). This key press causes the pressed key to be recorded and the keypad also being activated for all keys, whereby the credential interface 10*a-c* enters the active state 32.

For the third credential interface 10*c*, the communication module, the wake-up event 34 can e.g. be that the user physically interacts with the access control device/electronic lock 1. For instance, by holding or manipulation the doorknob or doorhandle, causing a switch to close, thus closing a circuit that powers the communication module. Alternatively or additionally, when the energy harvesting device 6 is present, actuation of the energy harvesting device can generate the wakeup signal. In this way, the communication is triggered by the natural action of the user attempting to gain access. As long as the time needed for establishing communication and performing access control is short, this results in an intuitive and smooth access control with no deliberate user action needed, other than attempting to open the door.

After access control for the user has been performed by the access control device/electronic lock 1, the credential interface 10*a-c* in active state returns to the low-power state, optionally after a time-out period of inactivity.

In one embodiment, when the third credential interface 10*c*, the communication module, is activated but no subsequent communication occurs with the communication module, the second credential interface 10*b* is activated, which can light up the keypad (the second credential interface 10*b*) to indicate to the user that a passcode can be entered for access. The third credential interface 10*c* would then return to the low-power state 30 to save power.

Using the provided access control device/electronic lock, a significant amount power is saved compared to the prior art. When coupled with the no-power low-power state and convenient activation events, the access control process is both intuitive and power efficient.

Here now follows a set of embodiments, enumerated with roman numerals.

i. An access control device comprising:
   a first credential interface; and
   a second credential interface;
   wherein the first credential interface is configured to be activated when a user causes an interaction with the first credential interface, without activating any other credential interfaces; and
   wherein the second credential interface is configured to be activated when a user causes an interaction with the second credential interface, without activating any other credential interfaces.

ii. The access control device according to embodiment i, further comprising a third credential interface being configured to be activated when a user causes an interaction with the third credential interface, without activating any other credential interfaces.

iii. The access control device according to embodiment i or ii, wherein the first credential interface is a reader for reading a near-field radio key tag, wherein the first credential interface is configured to be activated when an interaction occurs that the key tag is presented to the reader.

iv. The access control device according to embodiment iii, wherein the first credential interface is a Radio Frequency Identification, RFID, reader or a Near-Field Communication, NFC, reader.

v. The access control device according to embodiment iii or iv, wherein the first credential interface is configured to be activated by a magnet of the key tag.

vi. The access control device according to any one of the preceding embodiments, wherein the second credential interface is a keypad, wherein the second credential interface is configured to be activated when an interaction occurs that a key on the keypad is pressed.

vii. The access control device according to any one of embodiments ii to vi, when dependent on embodiment 2, wherein the third credential interface is a short-range wireless communication module, wherein the third credential interface is configured to be activated when the user physically interacts with the access control device.

viii. The access control device according to embodiment vii, wherein the third credential interface supports at least one of Bluetooth Low Energy, BLE, Bluetooth, or Zigbee.

ix. The access control device according to embodiment vii or viii, wherein the third credential interface is configured to be activated when the user turns a doorknob or doorhandle associated with the access control device.

x. The access control device according to any one of the preceding embodiments, further comprising an energy harvesting device configured to convert mechanical energy from regular lock or door manipulations by the user to electrical energy to power the access control device.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An electronic lock for controlling access to a restricted physical space, the electronic lock comprising:

a first credential interface for accepting a credential from a user for evaluating whether access for the user should be granted; and a second credential interface for accepting a credential from the user for evaluating whether access for the user should be granted;

wherein the first credential interface is configured to be activated when the user causes an interaction with the first credential interface, without activating any other credential interfaces; and wherein the second credential interface is configured to be activated when the user causes an interaction with the second credential interface, without activating any other credential interfaces; and wherein each activation implies a transition from a low-power state to an active state.

2. The electronic lock according to claim 1, further comprising a third credential interface for accepting a credential from the user for evaluating whether access for the user should be granted, wherein the third credential interface is a short-range wireless communication module, wherein the third credential interface is configured to be activated when the user physically interacts with the electronic lock.

3. The electronic lock according to claim 2, wherein the third credential interface supports at least one of Bluetooth Low Energy, BLE, Bluetooth, or Zigbee.

4. The electronic lock according to claim 2, wherein the third credential interface is configured to be activated when the user turns a doorknob or doorhandle associated with the electronic lock.

5. The electronic lock according to claim 1, wherein the first credential interface is a reader for reading a near-field radio key tag, wherein the first credential interface is configured to be activated when an interaction occurs that the key tag is presented to the reader.

6. The electronic lock according to claim 5, wherein the first credential interface is a Radio Frequency Identification, RFID, reader or a Near-Field Communication, NFC, reader.

7. The electronic lock according to claim 5, wherein the first credential interface is configured to be activated by a magnet of the key tag.

8. The electronic lock according to claim 1, wherein the second credential interface is a keypad, wherein the second credential interface is configured to be activated when an interaction occurs that a key on the keypad is pressed.

9. The electronic lock according to claim 1, further comprising an energy harvesting device configured to convert mechanical energy from regular lock or door manipulations by the user to electrical energy to power the electronic lock.

10. The electronic lock according to claim 1, wherein each credential interface is configured to accept a single credential in the form of an electronic key, a passcode, or biometry.

11. The electronic lock according to claim 1, wherein the low-power state is a standby state.

12. The electronic lock according to claim 1, wherein the low-power state is an unpowered state.

* * * * *